United States Patent
Maruta

(10) Patent No.: US 7,467,832 B2
(45) Date of Patent: Dec. 23, 2008

(54) CABINET FOR TELEVISION SET

(75) Inventor: Naoto Maruta, Daito (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 524 days.

(21) Appl. No.: 10/891,601

(22) Filed: Jul. 14, 2004

(65) Prior Publication Data

US 2005/0057124 A1 Mar. 17, 2005

(30) Foreign Application Priority Data

Jul. 24, 2003 (JP) .......................... 2003-270228 U

(51) Int. Cl.
*A47B 81/06* (2006.01)
(52) U.S. Cl. ........................ 312/7.2; 348/836
(58) Field of Classification Search .................. 312/7.2, 312/265.5, 265.6, 263, 257.1; 348/818, 805, 348/836, 839; 264/572
See application file for complete search history.

(56) References Cited

U.S. PATENT DOCUMENTS

| 4,360,838 | A | * | 11/1982 | Babicz et al. | ................ | 348/826 |
| 4,489,993 | A | * | 12/1984 | Hasegawa et al. | ............. | 312/7.2 |
| 5,067,022 | A | * | 11/1991 | Huerre et al. | ................ | 348/825 |
| 5,363,150 | A | * | 11/1994 | Kojima | ......................... | 348/836 |
| 5,629,745 | A | * | 5/1997 | Naito et al. | .................. | 348/836 |
| 5,956,101 | A | * | 9/1999 | Yang | ........................... | 348/843 |
| 6,039,912 | A | * | 3/2000 | Ohira et al. | .............. | 264/328.1 |
| 6,166,783 | A | * | 12/2000 | Ahn | ............................ | 348/836 |
| 6,619,764 | B2 | * | 9/2003 | Sugamura | ..................... | 312/7.2 |
| 6,663,198 | B2 | * | 12/2003 | Sugamura | ..................... | 312/7.2 |
| 6,729,700 | B2 | * | 5/2004 | Maruta | ........................ | 312/7.2 |
| 2002/0175602 | A1 | * | 11/2002 | Sugamura | ..................... | 312/7.2 |
| 2003/0230954 | A1 | * | 12/2003 | Fujii | ........................... | 312/7.2 |
| 2005/0206794 | A1 | * | 9/2005 | Tokuda | ....................... | 348/836 |

FOREIGN PATENT DOCUMENTS

| JP | 6-311459 | * 11/1994 |
| JP | 7-264514 | * 10/1995 |
| JP | 10-95027 | * 4/1998 |
| JP | 11-105058 | 4/1999 |
| JP | 2000-101952 | 4/2000 |
| JP | 3095555 | 5/2003 |

* cited by examiner

*Primary Examiner*—Janet M Wilkens
(74) *Attorney, Agent, or Firm*—Yokoi & Co., U.S.A., Inc.; Peter Ganjian

(57) ABSTRACT

A front structure included in a cabinet for a television set and formed by a gas assist injection molding process has a front wall and side walls extending backward from thick peripheral parts of the front wall, and is provided with joining structures each including a support structure consisting of a first reinforcing rib, a second reinforcing rib and a third reinforcing rib, and a boss supported by the support structure. The second and the third reinforcing ribs are extended from the first reinforcing rib toward the thick peripheral part to positions at a predetermined distance from the thick peripheral part such that the second and the third reinforcing rib are not joined directly to the thick peripheral part to prevent a gas flowing through the thick peripheral part from flowing into the joining structure.

5 Claims, 6 Drawing Sheets

HIGH-PRESSURE GAS

HIGH-PRESSURE GAS

CABINET FOR TELEVISION SET

BACKGROUND OF THE INVENTION

1. Field of the Invention

The present invention relates to a cabinet for a television set and, more particularly, to a cabinet for a television set, formed by a gas assist injection molding process.

2. Description of the Related Art

A prior art cabinet disclosed in, for example, JP-A No. 11-105058 for a television set, formed by a gas assist injection molding process has thick parts, such as corner parts in which projections, such as bosses and ribs, are formed concentratedly, normal parts of a normal thickness not provided with projections, and thin boundary parts of a small thickness forming boundary areas between the thick corner parts and the normal parts.

In molding the cabinet, a gas injected into a molding flows easily through the thick parts to the roots of bosses and ribs, while the thin parts obstruct the propagation of the gas. Consequently, the flow of the gas can be limited to ranges in the thick parts and thereby the control of formation of hollows in the thick parts is facilitated and the strength reduction of the roots of the bosses and ribs in the thick parts due to formation of excessive hollows can be prevented.

In molding this prior art cabinet, it is possible that the gas spread through the thick parts can flow through the roots of the bosses and ribs formed in the thick parts into the bosses and ribs. So long as bosses and ribs are formed in the thick parts, it is unavoidable that part of the gas spread through the thick parts flows into the bosses and ribs to form cavities in the bosses and ribs and, consequently, the strength of the bosses and the ribs is reduced.

SUMMARY OF THE INVENTION

The present invention has been made in view of the foregoing problems and it is therefore an object of the present invention to provide a cabinet provided with strong bosses and ribs for a television set.

A cabinet formed by a gas assist injection molding process for a television set in a first aspect of the present invention includes: a back structure; and a front structure provided with gas inlets through which a high-pressure gas is injected into a resin forming the front structure, and including a front wall provided with an opening, side walls extending backward from peripheral parts of the front wall, joining structures each consisting of a support structure and a cylindrical boss formed integrally with the support structure, having a center axis extending perpendicularly to the front wall, and provided with a hole for receiving a fastening member for fastening the back structure to the front structure; wherein each of the support structures has longitudinal first reinforcing rib joined directly to a side surface of the boss, a second reinforcing rib extending from the first reinforcing rib toward an edge of the front wall and terminating at a position at a predetermined distance from the edge of the front wall, and a tapered third reinforcing rib tapered toward the edge of the front wall, extending from the first reinforcing rib toward the edge of the front wall and having one end joined to a part, not joined to the side wall, of the second reinforcing rib.

The cabinet in the first aspect of the present invention is formed by a gas assist injection molding process. The front structure of the cabinet has the front wall provided with the opening, and the side walls extending backward from the edges of the frontwall. The ribs joined perpendicularly to the inner surfaces of the side walls, and the substantially cylindrical bosses joined to the ribs and respectively having longitudinal center axes are formed integrally with the front structure of the cabinet. The fastening members are engaged in the holes of the bosses to join the front structure and the back structure together. The front structure is provided with the gas inlets through which the gas is injected into the synthetic resin forming the front structure. The high-pressure gas injected through the gas inlets into the synthetic resin forming the front structure flows through the thick parts of the front structure. When the ribs and the bosses are joined to the thick parts, the high-pressure gas flows through the joints of the thick parts, and the ribs and the bosses into the ribs and bosses. Consequently, hollows are formed in the ribs and the bosses to reduce the strength of the ribs and bosses.

Each of the support structures includes the first reinforcing rib, the second reinforcing rib and the tapered third reinforcing rib. The first reinforcing rib has one end joined substantially perpendicularly to the side wall, and the other end directly joined to the side surface of the boss. Thus the support structures, the bosses and the front wall are formed integrally by a molding process. The second reinforcing ribs extend from the first reinforcing ribs toward the edges of the front wall. The extremities of the second reinforcing ribs extending toward the edges of the front wall are at the positions at the predetermined distance from the edges and are not joined directly to the edges of the front wall. Since the second reinforcing ribs are not directly joined to the edges of the front wall, the ribs and the bosses are not joined to the edges of the front wall and hence the high-pressure gas flowing through peripheral parts of the front wall does not flow into the ribs and the bosses. Consequently, any hollows are not formed in the ribs and the bosses by the high-pressure gas and the ribs and the bosses have necessary strength.

A large cabinet for a television set provided with a large display needs to have a high strength and hence peripheral parts of the front wall of the cabinet are formed in a big thickness. The bosses into which the fastening members are inserted to join together the front structure and the back structure, and the ribs holding the bosses on the front structure must be strong because the cabinet is large. The present invention enhances the strength of the cabinet by incorporating a front wall having the thick peripheral parts into the front structure, and intercepting the flow of the high-pressure gas through the thick peripheral parts of the front wall into the ribs and the bosses. Thus, the ribs and the bosses having high strength can be formed. Since the extremities of the second reinforcing ribs are spaced the predetermined distance apart from the edges of the front wall, the amount of the synthetic resin necessary for forming the front structure can be reduced, production cost can be reduced, and the cabinet can be formed in a lightweight structure.

Each of the tapered third reinforcing ribs is tapered toward the edge of the front wall, is extended from the first reinforcing rib toward the edge of the front wall, and has one end joined to a part, not joined to the side wall, of the second reinforcing rib. The tapered third reinforcing ribs are joined to the first and the second reinforcing ribs and thereby the strength of the support structures can be increased.

A cabinet formed by a gas assist injection molding process for a television set in a second aspect of the present invention includes: a box having side walls; support structures each consisting of ribs, joined to different parts, respectively, of the inner surfaces of the side walls of the box; and substantially cylindrical bosses respectively supported by the support structures and capable of receiving fastening members therein; wherein the ribs are not directly joined to predetermined thick parts of the cabinet.

The box, the ribs joined to the inner surfaces of the side walls of the box, and the substantially cylindrical bosses joined to predetermined parts of the ribs and capable of receiving the fastening members therein of the cabinet in the second aspect of the present invention are formed integrally by a gas assist injection molding process, and the ribs are not joined directly to the predetermined thick parts of the cabinet. Thus the flow of a high-pressure gas flowing through the predetermined thick parts into the ribs and the bosses joined to the bosses can be prevented. Consequently, hollows are not formed in the ribs and bosses, and the ribs and bosses have necessary strength.

The ribs may be formed in any proper shapes provided that the ribs are not directly joined to the predetermined thick parts of the cabinet. Therefore, in the cabinet in the second aspect of the present invention it is preferable that each of the ribs has a first reinforcing rib directly joined to the side surface of the boss, and a second reinforcing rib extending from the first reinforcing rib toward the thick part, terminating at a position at a predetermined distance from the thick part, and not directly joined to the thick part.

Thus each of the ribs of the cabinet has the first and the second reinforcing rib. The first reinforcing ribs are joined directly to the side surfaces of the bosses. Thus, the ribs and the bosses are formed integrally with the box. The second reinforcing ribs extending from the first reinforcing ribs toward the thick peripheral parts terminate at positions at a predetermined distance from the thick peripheral parts, and are not directly joined to the thick parts. Since the second reinforcing ribs are spaced a predetermined distance apart from the thick peripheral parts, the flow of the high-pressure gas from the thick peripheral parts into the bosses can be intercepted. Consequently, formation of hollows in the ribs and the bosses by the high-pressure gas can be prevented.

Preferably, the cabinet further includes third reinforcing ribs each extending from the first reinforcing rib toward the thick peripheral part and joined to an end, not joined to the side wall, of the second reinforcing rib. The third reinforcing ribs further enhance the strength of the support structures.

The third reinforcing rib joined to the first and the second reinforcing rib increases the strength of the support structures.

Preferably, each of the third reinforcing ribs has a tapered shape and tapering toward the thick peripheral part.

Even though each of the third reinforcing ribs has the tapered shape tapering toward the thick peripheral part, the third reinforcing rib joined to the first and the second reinforcing rib is effective in enhancing the strength of the support structure. The formation of the third reinforcing ribs in tapered shapes reduces the amount of a synthetic resin necessary for molding the cabinet, reduces production cost and the weight of the cabinet.

Preferably, the thick parts are peripheral parts of the front wall of the box. Thus flow of the high-pressure gas flowing through the peripheral parts of the front wall into the ribs and the bosses can be prevented and, consequently, hollows are not formed in the ribs and the bosses, and the ribs and bosses have necessary strength.

As apparent from the foregoing description, the cabinet for a television set is provided with strong ribs and bosses. The separation of the extremities of the second reinforcing ribs from the thick parts is effective in intercepting the flow of the high-pressure gas into the ribs and bosses.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
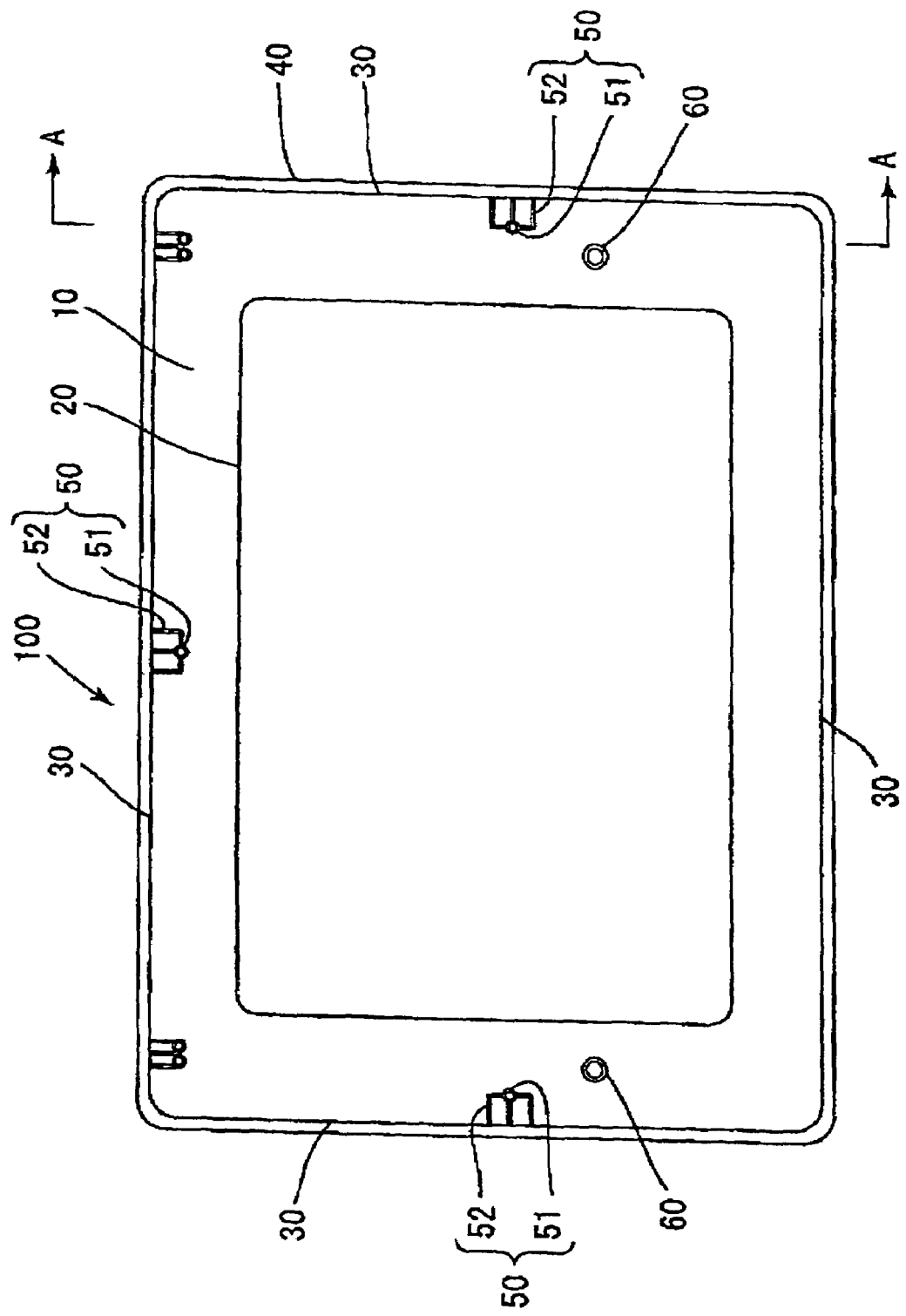
FIG. 1 is a rear view of a front structure included in a cabinet in a preferred embodiment according to the present invention.

FIG. 1 shows a front structure 100 included in a cabinet in a preferred embodiment according to the present invention for a television set in a rear view. The front structure is formed of a thermoplastic synthetic resin and has a front wall 10 provided with a central opening 20. A display, such as a CRT, is fitted in the opening 20 with its display screen facing front. Side walls 40 extend backward from the upper, the lower, the right and the left peripheral part 30 of the front wall 10.

Joining structures 50 are formed at predetermined positions on the inner surface of the side walls 40. Each joining structure 50 has a cylindrical boss 51, and a support structure 52 joined to the boss 51 and the side wall 40. The support structure 52 supports the boss 51 on the inner surface of the side wall 40. The front structure 100 and a back structure, not shown, are joined together by putting the front structure 100 and the back structure together such that predetermined parts of the front structure 100 and the back structure coincide with each other, and fitting fastening members projecting from the back structure in the bosses 51. Gas injection holes 60 are formed in the right and the left part of the front structure 100 so as to open in the back surface of the front wall 10. A plurality of projections, such as ribs and bosses, not shown, other than the bosses 51 and the support structures 52 are formed on the back surface of the front wall 40 and the inner surfaces of the side walls 40.

The front structure 100 including the bosses 51 and the support structure 52 is formed by a gas assist injection molding process. The gas assist injection molding process includes sequential steps of injecting a synthetic resin into the cavity of a mold, and injecting a high-pressure gas through the gas injection holes 60 into a molding formed in the mold to form hollows in predetermined parts of the molding. The hollows formed in the molding by the gas assist injection molding process prevent the formation of shrinkage cavities in the surface of the molding and the warping of the molding. The high-pressure gas tends to flow into thick parts of the molding. If strong parts that need to have strength are contiguous with the thick parts, the high-pressure gas flows through the thick parts into those strong parts and forms hollows in those strong parts. Formation of hollows in the strong parts by the flow of the high-pressure gas into those strong parts must be prevented.

The bosses 51 particularly must have high strength to withstand high external forces because the fastening members are fitted in the bosses 51 to join the front structure 100 and the back structure together. The support structures 52, similarly to the bosses 51, must be strong to support the bosses 51 on the side walls 40. In the front structure 100, the joining structures 50 each consisting of the boss 51 and the support structure 52 are spaced apart from the thick peripheral parts 30 to ensure that the bosses 51 and the support structures 52 have sufficient strength. The joining structures 50 each provided with the single boss 51 and those each provided with the two bosses 51 are shown in FIG. 1. Only the joining structure 50 provided with the single boss 51 will be described.

Figure 2:
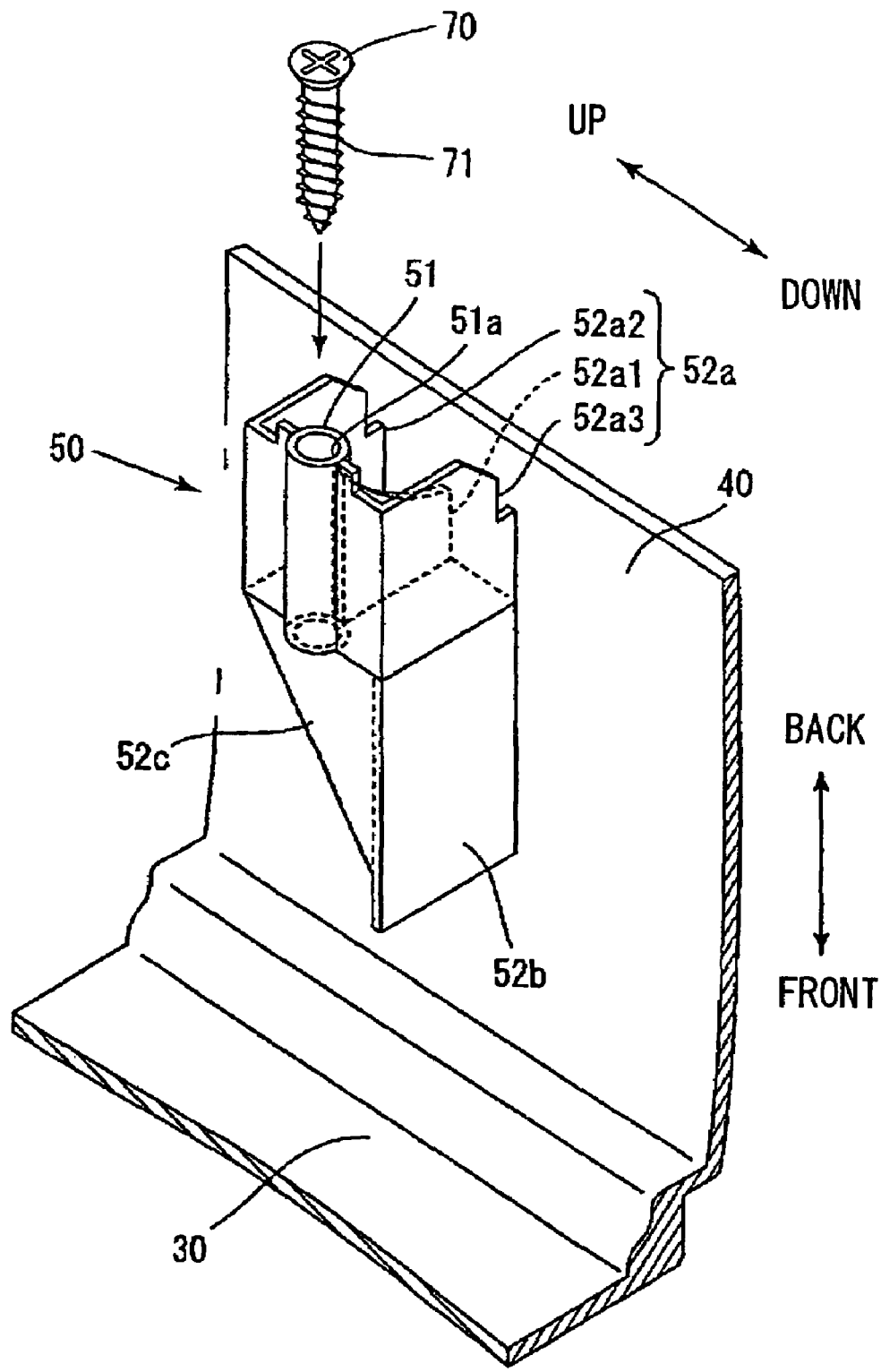
FIG. 2 is a perspective view of a joining structure formed in the front structure shown in FIG. 1.

FIG. 2 shows the joining structure 50 in a perspective view. In the following description, longitudinal and vertical directions with respect to the cabinet 100 are defined by the forward, backward, upward and downward arrows shown in FIG. 2. Referring to FIG. 2, the boss 51 has an axis extending in the longitudinal direction. The boss 51 has a substantially cylindrical hole 51a to receive a fastening member therein. The support structure 52 has a first reinforcing rib 52a consisting of reinforcing rib elements 52a1, 52a2 and 52a3, a second reinforcing rib 52b and a tapered third reinforcing rib 52c. Edges of the reinforcing rib elements 52a1, 52a2 and 52a3 are joined to the boss 51 and the side wall 40 to support the boss 51 at a predetermined position on the side wall 40. The reinforcing rib element 52a1 extends between the boss 51 and the side wall 40 perpendicularly to the side wall 40. The reinforcing rib elements 52a2 and 52a3 extend above and below the reinforcing rib element 52a1, respectively, substantially perpendicularly to the side wall 40. The reinforcing rib 52a2 element has a substantially L-shaped cross section. The reinforcing rib element 52a2 has a vertical leg substantially parallel to the side wall 40 and joined to the boss 51. The reinforcing rib element 52a3 has a substantially L-shaped cross section. The reinforcing rib element 52a3 has a vertical leg substantially parallel to the side wall 40 and joined to the boss 51.

The second reinforcing rib 52b extends from a part of the front end of the first reinforcing rib 52a toward the thick peripheral part 30. The second reinforcing rib 52b does not reach the thick peripheral part 30 and terminates at a predetermined position on the side wall 40.

As shown in FIG. 2, the tapered third reinforcing rib 52c is joined to the other part of the front end of the first reinforcing rib 52a and an edge, not joined to the side wall 40, of the second reinforcing rib 52b. The tapered third reinforcing rib 52c joined to the first reinforcing rib 52a and the second reinforcing rib 52b enhances the strength of the support structure 52 supporting the boss 51. The tapered third reinforcing rib 52c is tapered toward the peripheral part 30. The third reinforcing rib 52c is tapered to curtail the amount of the synthetic resin necessary for forming the front structure 100 and to form the front structure 100 in a lightweight structure.

The fastening members to be engaged in the holes 51a of the bosses 51 to fasten the back structure to the front structure 100 may be screws 70 as shown in FIG. 2. The screw 70 is rotated in the hole 51a to engage a screw thread 71 formed on the screw 70 with the side surface of the hole 51a. Therefore, the boss 51 and the support structure 52 must be strong enough not to be broken by force that may be exerted thereon.

Figure 3:
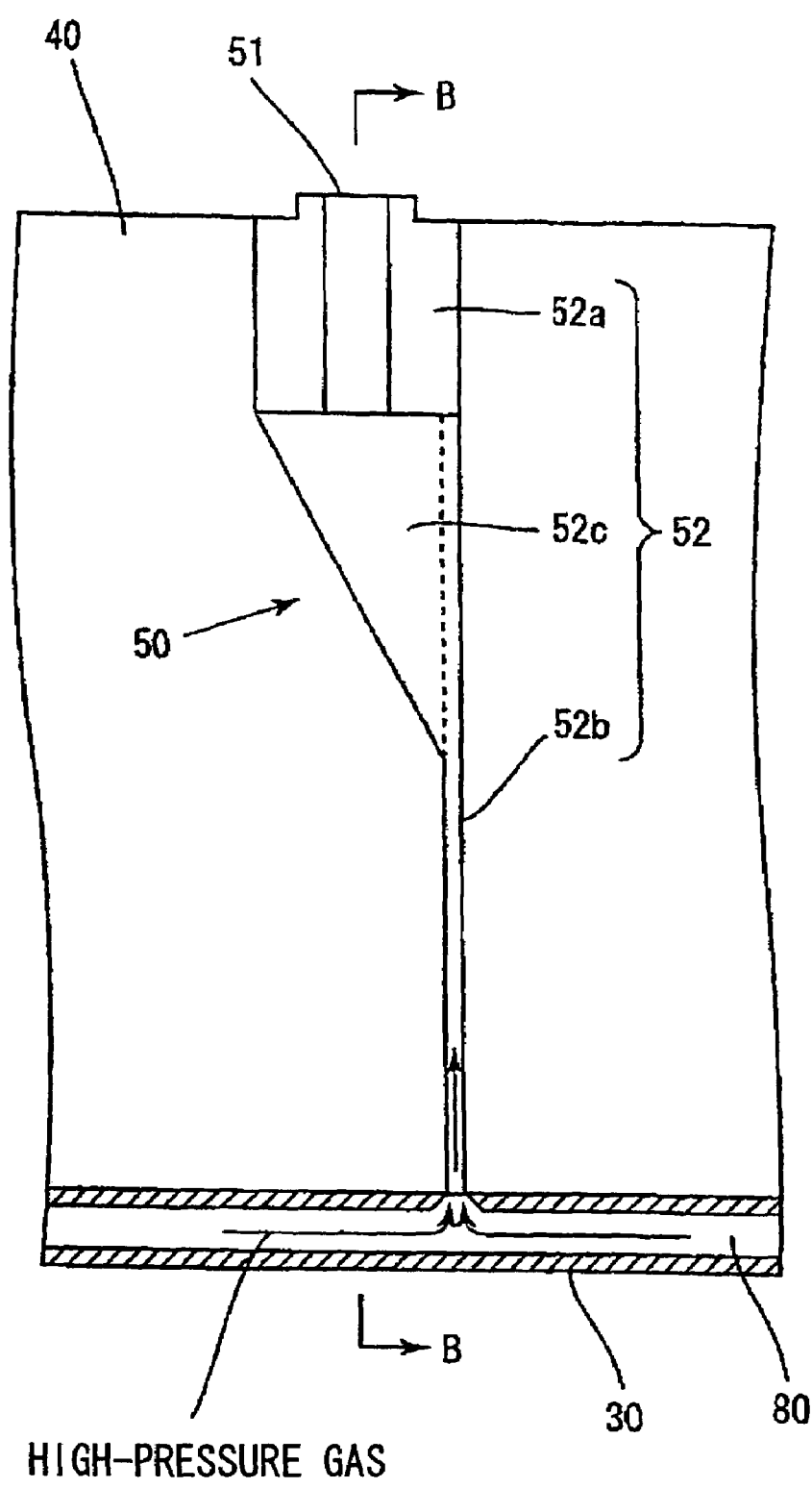
FIG. 3 is side elevation of a joining structure before improvement
Figure 4:
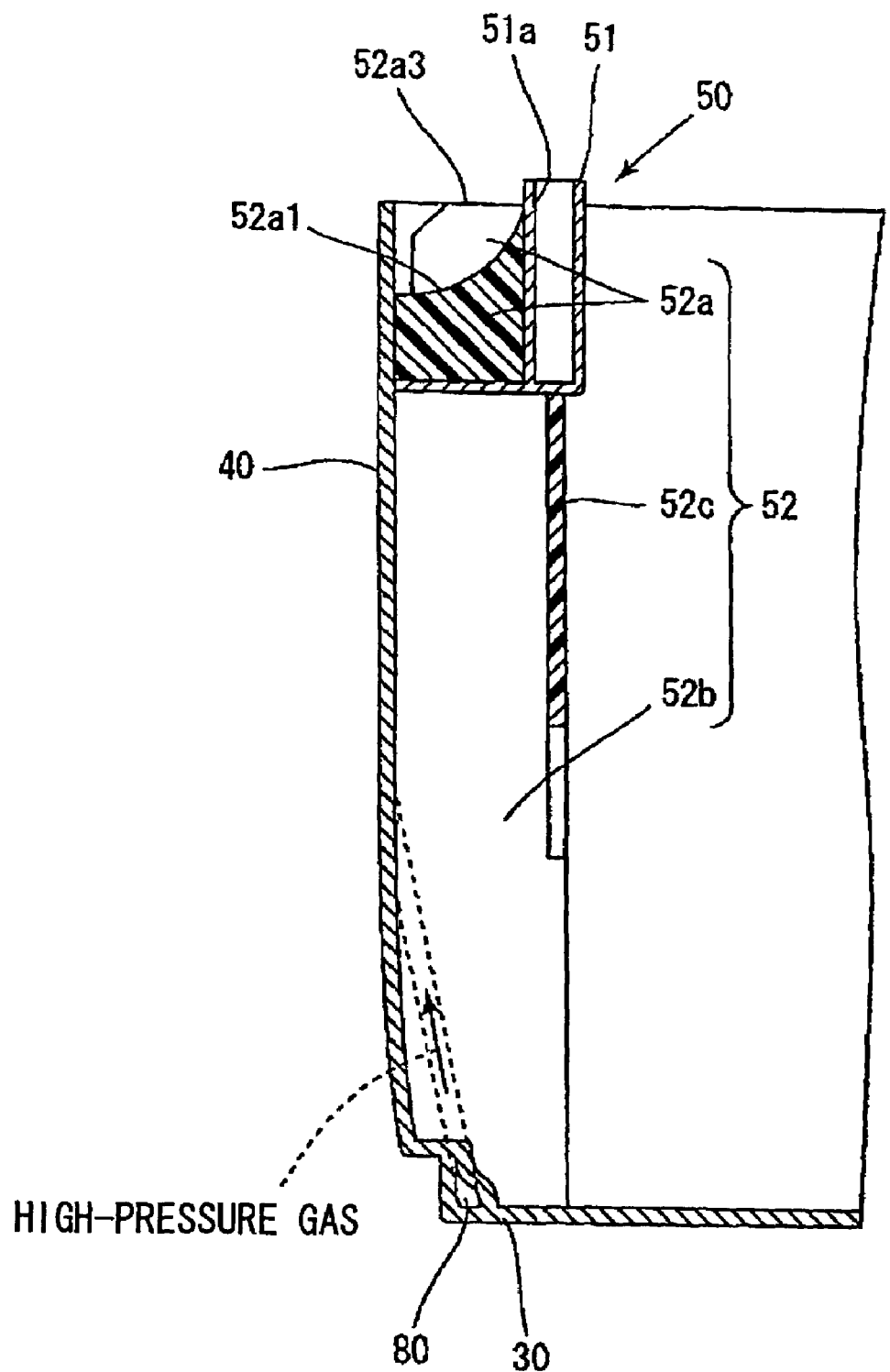
FIG. 4 is a sectional view taken on the line B-B in FIG. 3.

FIG. 3 shows a joining structure 50 before improvement in an enlarged sectional view taken on the line A-A in FIG. 1. FIG. 4 is a sectional view taken on the line B-B in FIG. 3. Referring to FIGS. 3 and 4, the unimproved joining structure 50 has a second reinforcing rib 52b reaching a thick peripheral part 30. Thus the joining structure 50 is joined directly to the peripheral part 30. A high-pressure gas is injected through an opening 60 into a passage 80 formed in the thick peripheral part 30.

Part of the high-pressure gas flowing through the passage 80 flows through the second reinforcing rib 52b joined to the peripheral part 30 into the support structure 52 and the boss 51. Consequently, hollows are formed in the support structure 52 and the boss 51 and thereby the strength of the boss 51 and the support structure 52 can be reduced. It is possible that the boss 51 and the support structure 52 thus weakened by the hollows are broken by force exerted thereon when the screw 70 is screwed into the hole 51a or the boss 51 and the support structure 52 are incapable of withstanding shocks that may act thereon when the front structure 100 is dropped. The high-pressure gas flowed into the boss 51 and the support structure 52 will form weld lines and galling to spoil the appearance of the front structure 100.

Figure 5:
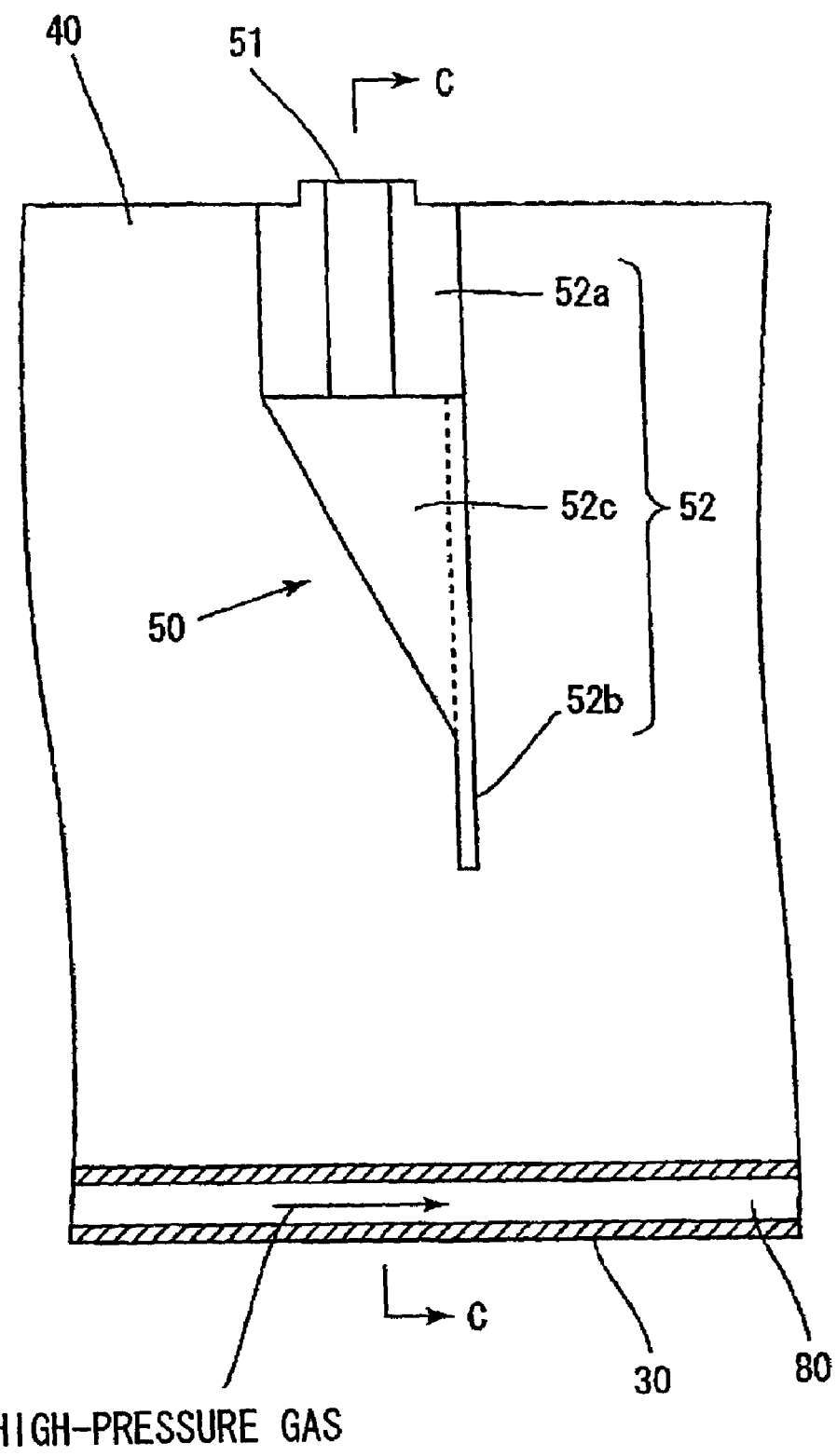
FIG. 5 is a side elevation of an improved joining structure.
Figure 6:
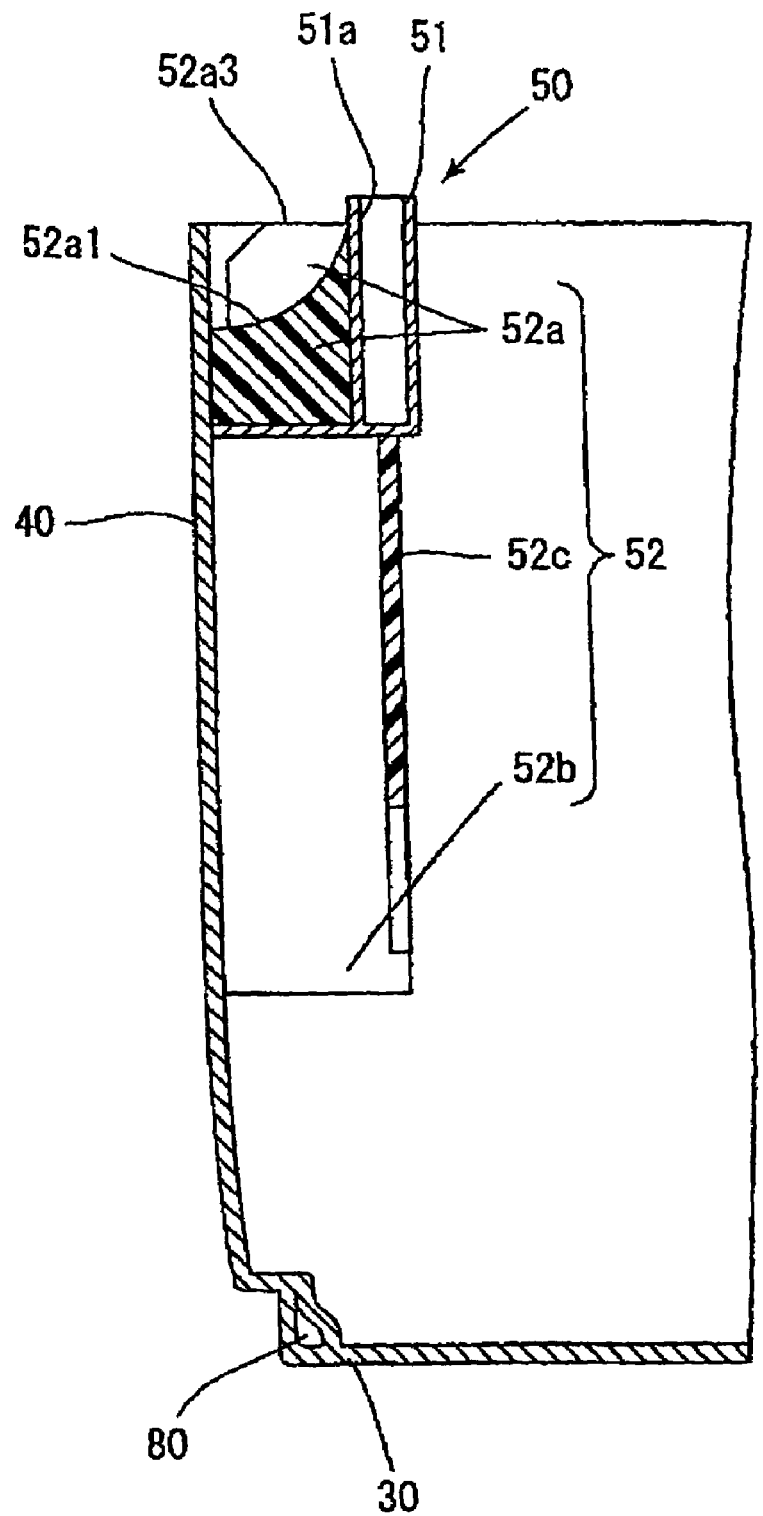
FIG. 6 is a sectional view taken on the line C-C in FIG. 5.

FIG. 5 shows the improved joining structure 50 in an enlarged sectional view taken on the line A-A in FIG. 1 and FIG. 6 is a sectional view taken on the line C-C in FIG. 5. As shown in FIGS. 5 and 6, the second reinforcing rib 52b is spaced a predetermined distance apart from the peripheral part 30 such that the second reinforcing rib 52b is not directly joined to the peripheral part 30 to prevent the high-pressure gas from flowing from the passage 80 in the peripheral part 30 through the second reinforcing rib 52b into the boss 51 and the support structure 52.

Thus the second reinforcing rib 52b is not extended to and not directly joined to the peripheral part 30 to intercept the flow of the high-pressure gas from the passage 80 into the joining structure 50. Therefore, the high-pressure gas flowing through the passage 80 is unable to form hollows in the joining structure 50. Consequently, the boss 51 and the support structure 52 have sufficient strength and are not damaged or broken by external force that will act thereon when the screw 70 is screwed in the hole 51a of the boss 51 or shocks that will act thereon when the front structure 100 is dropped, and weld lines and galling that spoil the appearance of the front structure 100 will not be formed.

The present invention is particularly useful for manufacturing a large cabinet for a television set. Most large cabinets are formed by the gas assist injection molding process. In the gas assist injection molding process, the high-pressure gas tends to flow through thick parts of a molding. If a strong part that must have high strength is joined to the thick part, the high-pressure gas flows into the strong part. Since a large display, such as a CRT is held in the large cabinet, the large cabinet needs thick peripheral parts 30 to have sufficient strength. Formation of hollows in the bosses 51 and the support structures 52 supporting the bosses 51 must be prevented to form the basses 51 and the support structures 52 having sufficient strength and capable of withstanding large load.

Although the high-pressure gas is able to flow easily through the thick peripheral parts 30 of the front structure 100 of the cabinet according to the present invention, the high-pressure gas is unable to flow into the joining structures 50. The present invention is capable of achieving two conditions required of manufacturing the large cabinet for a television set, namely, forming the sufficiently strong thick peripheral parts 30 and preventing the formation of hollows by the high-pressure gas in the joining structures 50 that are required to have high strength.

Since the second reinforcing ribs 52b are not joined to the peripheral parts 30 and are spaced a predetermined distance apart from the peripheral parts 30, the amount of the synthetic resin necessary for forming the front structure 100 is small as compared with that of the synthetic resin necessary for forming a front structure in which second reinforcing ribs are joined to peripheral parts and hence the manufacturing cost of the front structure 100 is lower than that of the latter front structure. Since the front structure 100 needs a small amount of the synthetic resin, the front structure 100 can be formed in a lightweight structure.

The front structure 100 of the cabinet according to the present invention reduces cabinet manufacturing time, and extends the useful life of the mold. Parts of the mold need to be moved from the side of the back surface of the front structure 100 toward the peripheral parts 30 for a distance corresponding to the length of the joining structures 50 to mold the joining structures 50. The second reinforcing ribs 52 are not extended to the peripheral parts 30 and hence the distance for which the parts of the mold need to be moved can be reduced accordingly. The reduction of the distance for which the parts of the mold need to be moved curtails molding cycle time necessary for molding the front structure 100. Consequently, a large number of front structures 100 according to the present invention can be produced in a production time shorter than that necessary for producing front structures for conventional cabinets. The reduction of the distance for which the parts of the mold need to be moved is effective in extending the useful life of the mold.

Since the second reinforcing ribs 52b are not joined to the peripheral parts 30 and are spaced a predetermined distance apart from the peripheral parts 30, the flow of the high-pressure gas from the passage 80 into the joining structure 50 can be prevented. Therefore, the high-pressure gas flowing through the passage 80 is unable to form hollows in the bosses 51 and the support structures 52 of the joining structure 50. Consequently, the bosses 51 and the support structures 52 have high strength.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. A cabinet, comprising:
  a front structure having one or more gas injection holes with gas inlets and passages through which a high-pressure gas is injected into a resin to form the front structure by gas assist injection molding;
  the front structure, further including a front wall having a center opening and peripheral parts;
  side walls extending backward from peripheral parts of the front wall;
  the peripheral parts connect the front wall and the side walls, and have a thickness that is greater than the thickness of the side walls and other parts of the front wall, with the passages formed in the peripheral parts of the front wall;
  plurality of joining structures, with a joining structure of the plurality of joining structures comprising:
  a support structure;
  a substantially cylindrical boss integrally formed with the support structure;
  the substantially cylindrical boss having a center axis extending perpendicularly to the front wall, and including a hole for receiving a fastening member;
  the support structure, comprising:
  a first reinforcing rib joined directly to a side surface of the substantially cylindrical boss;
  the first reinforcing rib includes:
  first, second, and third reinforcing rib elements having a first side that directly couple with the side surface of the substantially cylindrical boss and are spaced apart at approximately 90 degrees along an outer circumference of the substantially cylindrical boss;
  the first, second, and third reinforcing elements of the first reinforcing rib having a second side that directly couple with an inner surface of the side walls;
  the first, second, and third reinforcement elements of the first reinforcement rib having a third side that coupled the side wall with the substantially cylindrical boss;
  the third side of the first reinforcement element of the first reinforcement rib having a first edge that is sloped upwards from the side wall towards the substantially cylindrical boss, forming a smooth, incurvate edge;
  the third side of the second and third reinforcement elements of the first reinforcement rib having an edge that includes a first section that is oriented substantially parallel with the peripheral part, a second section that is contiguous with the first section and that is oriented substantially perpendicular with the peripheral part, a third section that is contiguous with the second section and that slopes at an angle upwards towards substantially cylindrical boss, and a fourth section that is contiguous with the third section and oriented substantially parallel with the peripheral part;
  a second reinforcing rib directly coupled with the inner surface of the side wall, extending from the third reinforcing element of the first reinforcing rib toward the peripheral parts of the front wall, terminating at a position at a predetermined distance from the peripheral parts of the front wall, away from the passages; and
  a tapered third reinforcing rib tapered toward the peripheral parts of the front wall, extending from the second reinforcing element of the first reinforcing rib toward the peripheral parts of the front wall and having one end joined to the second reinforcing rib.

2. A cabinet for a television set, said cabinet comprising:
  a box having a front wall with peripheral parts that includes passages, and side walls;
  the peripheral parts of the front wall connect the front wall and the side walls, and are thicker than other parts of the front wall;
  substantially cylindrical bosses respectively supported by a set of support structures and capable of receiving fastening members therein;
  the set of support structures are comprised of reinforcing ribs, with a first reinforcing rib that includes:
  first, second, and third reinforcing rib elements having a first side that directly couple with the substantially cylindrical bosses and are spaced apart at approximately.90 degrees along an outer circumference of the substantially cylindrical bosses;
  the first, second, and third reinforcing elements of the first reinforcing rib having a second side that directly couple with an inner surface of the side walls;
  the first, second, and third reinforcement elements of the first reinforcement rib having a third side that coupled the side wall with the substantially cylindrical boss;
  the third side of the first reinforcement element of the first reinforcement rib haying a first edge that is sloped upwards from the side wall towards the substantially cylindrical boss, forming a smooth. incurvate edge;
  the third side of the second and third reinforcement elements of the first reinforcement rib having an edge that includes a first section that is oriented substantially parallel with the peripheral part, a second section that is contiguous with the first section and that is oriented substantially perpendicular with the peripheral part, a third section that is contiguous with the second section and that slopes at an angle upwards towards substantially cylindrical boss, and a fourth section that is contiguous with the third section and oriented substantially parallel with the peripheral part;
a second reinforcing rib coupled with one of the first, second, and third reinforcing rib elements of first reinforcing rib; and
a third reinforcing rib coupled with at least one of another of the first, second, and third reinforcing rib elements of first reinforcing rib;
with the reinforcing ribs positioned away from the peripheral parts and the passages of the front wall of the cabinet.

3. The cabinet according to claim 2, wherein the second reinforcing rib extends from the third reinforcing element of the first reinforcing rib toward the peripheral parts of the front wall, spaced a predetermined distance apart from the passages of the peripheral parts.

4. The cabinet according to claim 3, wherein the third reinforcing ribs each extending from the second reinforcing element of the first reinforcing rib toward the peripheral parts and having one end joined to the second reinforcing rib.

5. The cabinet according to claim 4, wherein each of the third reinforcing ribs has a tapered shape tapering toward the peripheral parts from the second reinforcing element of the first reinforcing rib towards the third reinforcing element of the first reinforcing rib.

* * * * *